INVENTOR
GEORGE G. BRUCK

INVENTOR
GEORGE G. BRUCK
BY John Graham
ATTORNEY

Patented July 13, 1954

2,683,402

UNITED STATES PATENT OFFICE 2,683,402

PHOTOCELL CONTROL SYSTEM FOR CAMERA DIAPHRAGMS

George G. Bruck, Central Islip, N. Y., assignor to Specialties, Inc., Syosset, N. Y., a corporation of New York Application May 24, 1950, Serial No. 163,977

10 Claims. (Cl. 95—64)

This invention relates to automatic electric control systems for automatic exposure control of photographic apparatus subjected to variation of conditions of illumination.

In the art of photography it is often of great benefit to relieve the operator of the necessity of having any concern with light conditions and changes thereof and to provide means to automatically compensate or adjust the camera to preserve a preselected illumination value at the film or other photosensitive surface. One illustrative use thereof is in the art of aerial photography and hereinafter such art will be used for purposes of explanation and illustration but without limiting the applications and uses of the present invention in any way.

Particularly in the art of aerial photography, it is often desired that variations of the illumination of the subject being photographed, such as terrain over which the aircraft is flying, shall be compensated for without needing any attention from the pilot of other operating personnel of the aircraft.

Furthermore, with modern high speed flight of aircraft, large changes of the intensity of illumination of the terrain being photographed by airborne cameras may occur much too rapidly for even a highly experienced photographer to compensate for the changes in the short time involved, so that the resultant photographs will be of widely different densities.

As an example, aerial cameras of the strip type, which are adapted to take continuous or strip photographs of the terrain over which the aircraft travels, require adequate and efficient means for maintaining the light intensity falling upon the film in the camera at a predetermined value in order that the finally produced photographs can give an accurate representation of the terrain photographed, without areas of lighter or darker density.

The present invention has for a specific object the provision of completely automatic means for maintaining the light intensity falling upon a film within an aerial camera substantially at a predetermined value, irrespective of the variations of light conditions on the terrain over which the camera is flown for photographic purposes.

A further object of the invention is to provide automatic means for compensating for variations in intensity of illumination for use with a camera such as an aerial camera.

Generally, the present invention, provides an automatic control system for compensating for changes of light intensity on an object to be photographed and adjusting the camera characteristics to suit such changes and maintain a preselected light intensity at the film or other photosensitive surface in the camera having as its essential elements two opposed networks one of which includes a photocell and the second of which is a reference network, whereby the out-of-balance of the two networks can be used to modify and control the amount of light passing through the camera lens.

Usually, an iris is used in a camera to vary the effective area of the lens and thus control the amount of light received by the film and hereinafter references to control of iris aperture for this purpose will be made as illustrative of a means conventionally employed to adjust and control the light intensity at the film.

In the present invention, means are provided to manually or automatically set or select shutter speeds to suit conditions to be encountered or changed conditions observed, this preferably comprising changing the resistance of the reference network relative to the photocell network, to thereby alter the point of balance.

Although control of illumination of the film by variation of lens aperture, namely iris adjustment is normally undesirable in photographic work due to variations of depth of field caused thereby, the present invention is particularly adapted for aerial photography where under nearly all conditions subjects being photographed are at infinity and therefore depth of field is of no consequence.

Generally, in practising the present invention, an electric motor drives the usual iris of an aerial camera and also drives an iris in front of a photocell of the barrier layer type. Whenever light intensity at the camera film is correct the motor and irises are motionless.

When a change of light intensity occurs, this is observed by the photocell and causes a signal to be sent to the signal network to indicate that a new iris setting is now required in order to maintain the light intensity at the film at the pre-set value. Photocell information is matched against information received from the reference circuit, which information is pre-set and fixed for each equivalent shutter speed. When the information of the two circuits does not match, a comparator or electronic balance system puts out a signal which when amplified drives the motor in accordance with the polarity of the signal, to open or close the irises.

It is one unique feature of the present invention that the photocell is used with reverse voltage applied thereto. A barrier layer photocell is a semi-conductor and will conduct in one direction while in the opposite direction it is practically a non-conductor, provided it is not illuminated. However, when illuminated, it will conduct a small amount of current in this opposite direction. If constant voltage is applied in this opposite direction, the current flowing will be substantially proportional to light intensity.

The photocell circuit comprises a photocell of the barrier layer type parallel with a condenser and both are connected in series with a resistor, D. C. being supplied to the circuit through a rectifier from a source of constant A. C. voltage. Current passed by the photocell is approximately proportional to the light intensity falling thereon and it discharges the parallel condenser at a rate proportional to this illumination. The condenser is recharged every 2½ milliseconds to the peak value of the constant voltage source and the flow of charging current through the series resistor produces a voltage drop which is used as information.

The reference circuit duplicates the photocell circuit except for a fixed resistor in place of the photocell which is selected as to resistance value according to camera shutter speed and can comprise a gang of resistors selectively put in circuit to suit various shutter speeds. The voltage across the two charging resistors are compared and when they are equal no signal results but if one or the other voltage is predominant, the resultant signal will have a polarity in accordance with the predominating voltage.

After filtering, phase shifting and suitable amplification, this signal can be applied to one phase of a two phase motor, the other phase of which is associated with the source of initial A. C. supply.

Reference is now made to the accompanying drawings illustrating the present invention, in which.

Figure 1:
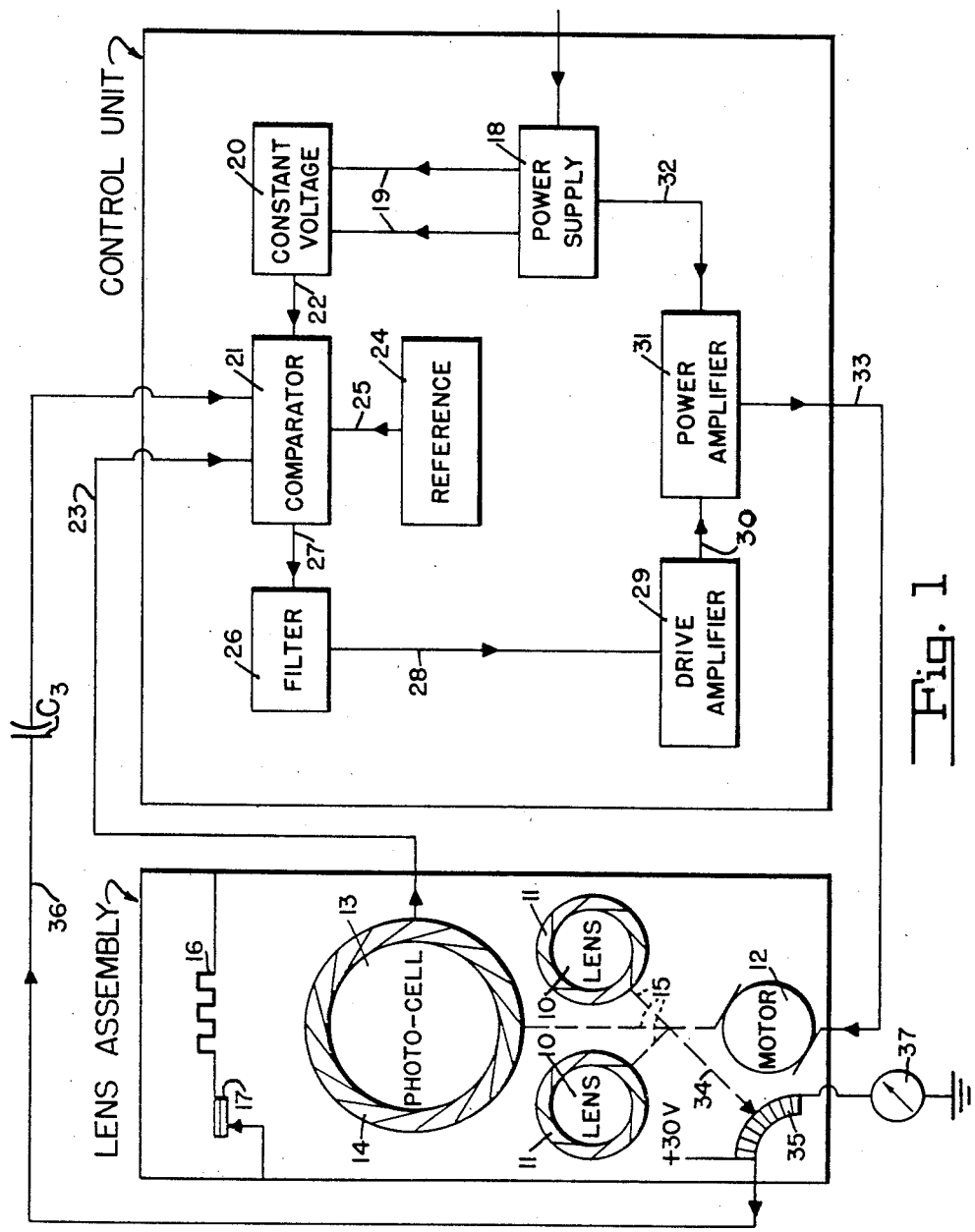
Figure 1 is a block diagram of the automatic control system of the present invention showing its component parts.

Referring specifically to Fig. 1 of the drawings, the operating principle of the system can be readily understood as applied to a stereographic aerial camera having twin lenses 10. Each lens will have associated therewith the usual iris diaphragm 11 for varying the effective area of the lens from its maximum aperture position to a minimum position as is usual with such cameras and the two iris diaphragms for lenses 10 will be coupled together in a stereographic camera.

A suitable electric motor 12 is provided for causing rotation of the parts of the diaphragms which affects the control of lens aperture.

This conventional lens assembly is modified in accordance with the present invention by mounting suitably associated with the lenses 10 a photocell 13 of the barrier-layer type also having an iris diaphragm 14 which is coupled with the drive of motor 12 so that it moves in unison with diaphragms 11 by means of suitable gearing shown dotted at 15. The modified lens assembly illustrated is suitably mounted on the aerial or other camera with which it is to be used and is so designed that the photocell 13 views the field which is to be photographed by the stereo lens assembly 10.

Since the output of photocells of the type utilized may be affected by temperature changes of extreme range such as may be encountered in aerial flight a photocell heater 16 is mounted in thte lens assembly in position to maintain the photocell 13 at a constant temperature of desired value, this heater being turned off and on by a thermostat 17 to maintain this constant temperature, a suitable source of electric supply being supplied thereto in any usual manner.

The lens assembly forming part of the camera conventionally is carried by the aircraft in suitable position for taking the desired photographs.

The control unit, to be now described, can however, occupy a position completely remote from the camera-lens assembly and need only be connected thereto by suitable multi-wire cable whereby the intelligence obtained from the photocell 13 can be received and whenever correction of lens apertures is required, this information can be transmitted back to the motor 12.

The control unit indicated in Fig. 1 consists of several components. A power supply 18 is fed from a suitable source of alternating current, such as the 115 volt 400 cycle available on many types of aircraft. One output of the power supply is fed by leads 19 to a device which will maintain and deliver a constant A. C. voltage irrespective of variations of current supplied to or from the power supply 18.

The constant voltage thus obtained in fed to a comparator device 21 by a lead 22. Comparator 21 receives the intelligence from the photocell 13 by a lead 23 and is so constructed, adapted, and arranged to operate that this intelligence is matched against a reference 24 communicating with the comparator through lead 25.

The values of reference 24 are preset to suit the average light conditions expected or encountered during the photographic run and these will vary and be varied to suit factors such as the emulsion speed of the film being used.

When these average light conditions are realized the reference circuit and the intelligence circuit will be in balance and no signal will result. When, however, the two circuits are out of balance a signal will result in magnitude and polarity equivalent to the change in light conditions above or below average observed.

This signal is first filtered to eliminate the high harmonics of the pulse-type signal and this filter 26 fed from the comparator by lead 27 is also adapted to rotate the phase angle by ninety degrees. Filter 26 thus supplies a 400 cycle filtered signal shifted ninety degrees with respect to the line or reference voltage and its relative polarity thereto will depend upon whether the photocell 13 is receiving too much or too little light.

This signal is passed by lead 28 first to a drive amplifier 29 and then by lead 30 to a power amplifier 31, the power supply 18 feeding current to the power amplifier by lead 32.

The amplified filtered and phase shifted signal is now applied by lead 33 to the one phase of the two phase motor 12, the other phase of which is supplied by the reference or line voltage.

Accordingly, motor 12 will rotate in one or the other direction under urge of this signal to modify the effective apertures of the stereolenses 10 and photocell 13 until the intelligence circuit of comparator 21 is again in balance with the circuit of reference 24.

Thus, by this means any variation of light conditions observed by photocell 13 will cause immediate and automatic compensation therefor.

In servomechanisms of the type just described damping or anti-hunt means are desirable and to this end, means are preferably provided to damp the movements of motor 12 with a derivative of the error signal detected by comparator 21.

To this end, also coupled to move with motor 12 by linkage 34 is a variable resistor 35 which is suitably energized by an independent source of power than that used for the other components. The voltage drop across resistor 35 will vary as a function of lens aperture and this is led through condenser C3 to comparator 21 by lead 36. The derivative thus obtained has a maximum value which corresponds to the actual maximum rate of change of area of the irises 11 and 14. The derivative is added to the input signal or intelligence from photocell 13 but it will not have appreciable effect until the null point of motor 12 is practically approached and then it can come into effect as a relatively large retarding force to abruptly stop the mechanism.

Since the current passing through resistor 35 is a measure of the actual position of the iris 14 of photocell 13, a suitable ammeter 37 may be connected in lead 102 and if this is calibrated in $f$ stops it will give a fairly accurate indication of the position of the irises of photocell and lenses and thus can warn of changed light conditions necessitating resetting of the values of the reference 24, to establish a new average illumination condition for a new shutter speed.

Figure 2:
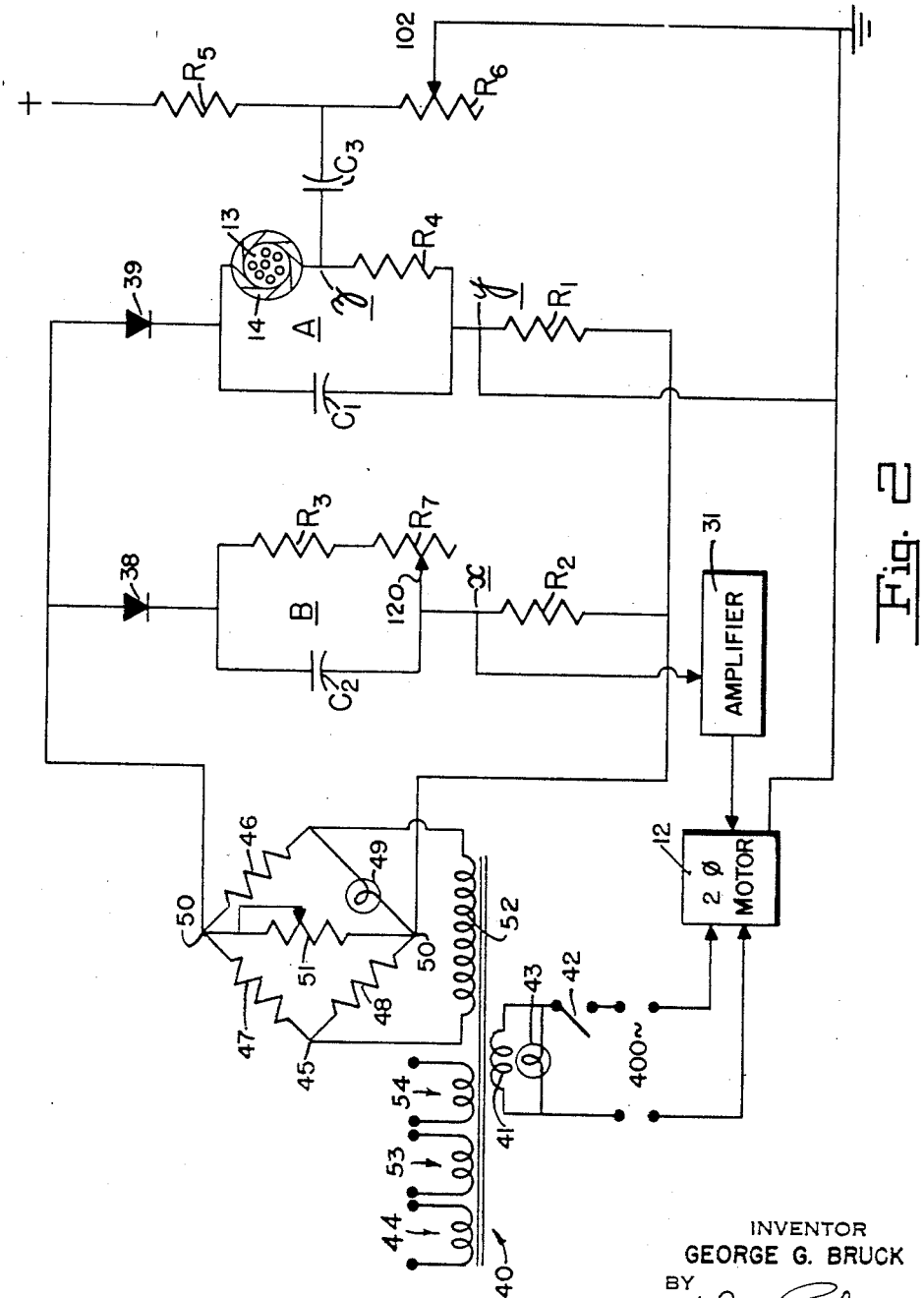
Figure 2 is a schematic circuit diagram of the system of automatic control of the present invention.

Referring to Fig. 2, there is shown a schematic representation which essentially can perform the functions of control hereinbefore described.

In Fig. 2, a first intelligence network A is associated with resistor $R_1$ and a second reference network B is associated with resistor $R_2$.

Network B forms reference 24 of Fig. 1 and comprises a condenser $C_2$ in parallel with a fixed resistor $R_3$, both fed from a source of A. C. supply at a frequency of 400 cycles and at a very low operating voltage through a rectifier 38. Resistor $R_2$ is in series with condenser $C_2$ and resistor $R_3$. Network A comprises a condenser $C_1$ connected in parallel with both a fixed resistor $R_4$ and is fed by photocell 13, the source of A. C. supply being fed thereto through a rectifier 39.

When photocell 13 is illuminated, the current which passes thereby will be approximately proportional to the intensity of the light and the condenser $C_1$ will be discharged at a rate depending upon the intensity of light and will be recharged in a fraction of a second by the rectified A. C. supply. A photocell of the barrier-layer type when arranged in a circuit as in Fig. 2, will act as a semi-conductor and its resistance will vary with the amount of light applied thereto. Thus, the amount of discharge of condenser $C_1$ through photocell 13 is a measure of the light intensity.

The actual discharge of the condenser $C_1$ will be over the major portion of the cycle and over the remaining portion, which is very small, the fluctuating direct current will charge the condenser.

If the network B has the same characteristics as network A then at a predetermined light intensity on photo-cell 13 there will be no voltage drop between points $y$ at ground potential and $x$ and the voltages across the resistors $R_1$ and $R_2$ will be balanced. Upon change of light intensity either above or below the present and preselected level there will be an out-of-balance between these voltages, namely, a voltage differential between points $x$ and $y$, which will be proportional substantially to the change of light intensity.

The signal thus produced is picked up at point $x$ and fed to the amplifier 31. After passing the filtering and phase shifting filter 26 and amplification, the output is applied to the variable phase of the two-phase motor 12, the fixed phase of which will be suitably excited from the 400-cycle source of supply. Motor 12 will thereby rotate under the influence of the amplified signal, the magnitude and direction of rotation being determined by the increase or decrease of light intensity on photocell 13.

The rotation of motor 12 is applied to the iris 14 associated with photocell 20. The iris 14 will increase or decrease in diameter by this rotation in accordance with the increase or decrease of light until the intensity of illumination on the photocell is established at the preselected, desired value. The system will then be again in balance with no voltage drop between points $x$ and $y$.

In the specific embodiment, the motor 12 is adapted to simultaneously rotate the iris associated with the camera lenses 10 so that the light upon the film in the camera will remain at a constant value, which value can be preselected by proper choice of the values of reference 24. This constant value will bear a positive relationship to the amount of light established as the desired value on the photocell 13 and on the film.

As a further refinement, to provide anti-hunt features and to anticipate the changes to take place, the motor 12 also drives the arm 34 of a variable resistor $R_6$ (35 in Fig. 1), one end of which is connected through a condenser $C_3$ with the photocell 13 at point $z$. Arm 34 is grounded and a fixed resistor $R_5$ is connected in series with the variable resistor and with a source of D. C. supply at a suitable voltage. Obviously, as arm 34 moves under urge of motor 12, the total resistance of $R_5$ plus $R_6$ will be altered and a voltage proportional to the rate of change of the light intensity on the photocell will be given to the network A. Since the magnitude of this voltage is proportional to the light intensity change, this will give advance information as to the movements of the iris 14 to the network A and also will act to prevent hunting.

The values of resistors $R_5$ and $R_6$ (Fig. 2) can obviously be chosen to provide any desired result in the damping or anti-hunt system.

$R_6$ may be a non-linear potentiometer for example and by selecting the right resistance values for same and for resistor $R_5$ the amount of lead in the control circuit can be made a function of servo-position, namely, the position of motor 12.

The advantage of control of the amount of lead is particularly apparent in conditions where the information given by the servo-system is non-linearly related to the angular displacement of the servomotor.

In the system illustrated in Fig. 2, it is desirable that the voltage applied to the networks A and B shall be substantially constant to obviate errors caused by variations of current supply since the absolute accuracy of the photocell 13 depends to a great extent on a constant applied voltage.

To this end, as shown in Fig. 2, a Wheatstone bridge circuit is provided which utilizes four resistors and a tungsten filament lamp.

A power supply transformer 40 has a primary winding 41 which is fed from a source of supply such as 400 cycle 115 volt alternating current through a control switch 42, a pilot light 43 being in parallel with primary 41 to indicate when current is on. One secondary winding 44 serves as input to the bridge 45 in the arms of which are two matched precision resistors 46, 47 having values of 270 megohms each, a precision-resistor 48 of 100 megohms and in the fourth arm is a tungsten filament lamp 49. Between the output points 50 of the bridge is a variable resistor 51 whereby initial balance of the bridge can be obtained.

The filament of lamp 49 will change its resistance with the applied voltage fluctuations and thus will unbalance the bridge as necessary to maintain an output from points 50 which is constant to a satisfactory degree.

Transformer 40 has other secondary windings for the purpose conventionally of providing power supply for the various electronic tubes used in amplifier 31. To this end a high voltage winding 52 will deliver for example, 300 volts for the plate current of the various tubes to be described whilst a low voltage secondary winding 53 supplies the heaters for the tubes at, for example, 12 volts. A suitable grid bias supply such as 20 volts is provided by a third secondary winding 54.

Inasmuch as the connections between these electric supplies and the various tubes are conventional for purposes of clarity the specific wiring thereof is omitted.

Figure 3:
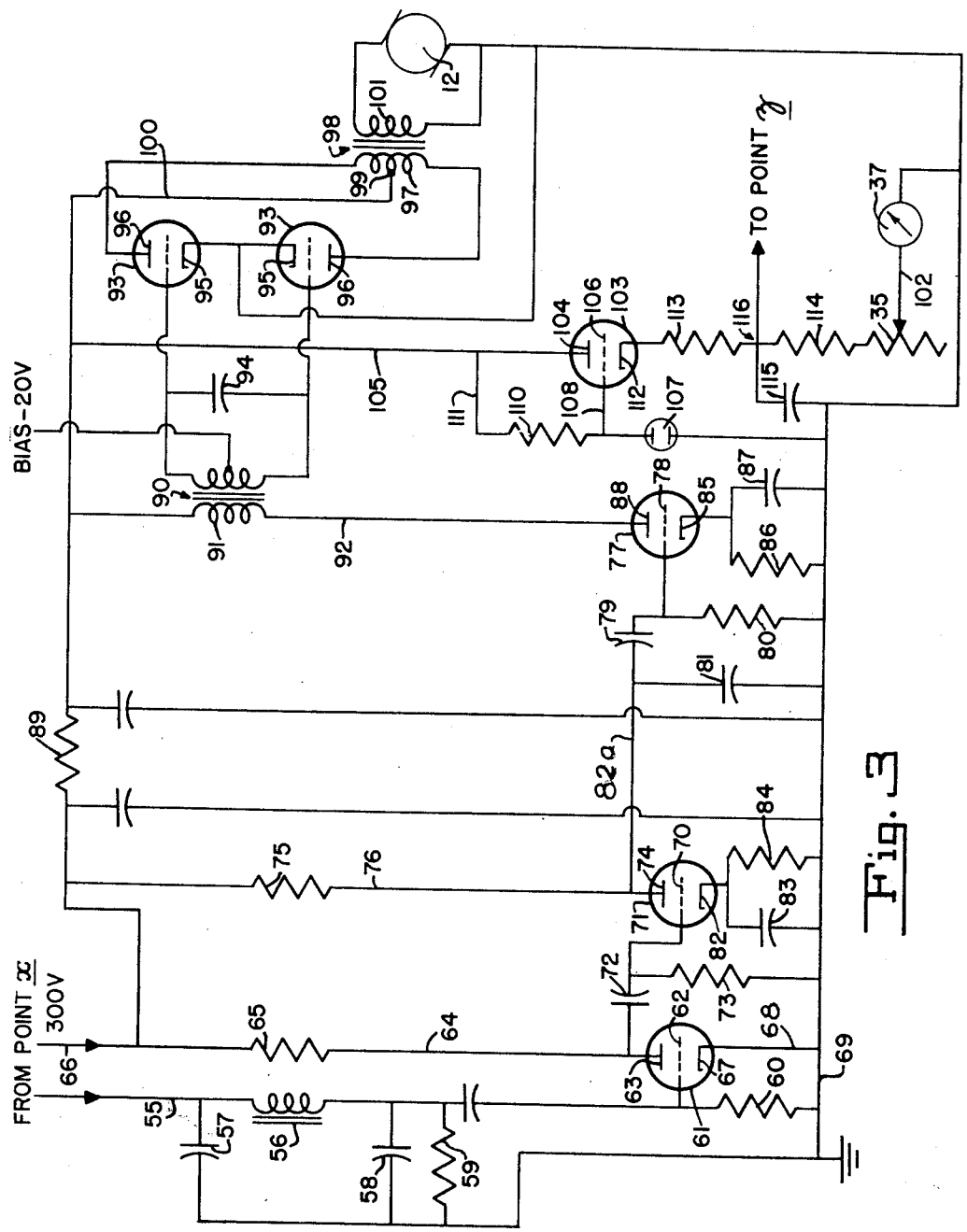
Figure 3 is a circuit diagram of filter and amplifier parts of the system of Fig. 2, showing certain modifications.

Fig. 3 is a circuit diagram of the system according to the present invention for amplifying the out-of-balance signal of comparator 21 and applying this to motor 12 for the purpose described.

Referring to Fig. 3, lead 55 comes from point $x$ of Fig. 2 whereby the signal from comparator 21 may be first filtered and then amplified.

The high harmonics of the pulse type signal are eliminated in filter 26 which comprises a single pi-section formed of choke 56 and condensers 57 and 58 with load resistors 59 and 60 and simultaneously this unit serves the purpose of rotating the phase angle by 90°.

This voltage is applied to the grid 62 of a first vacuum tube 61 whose plate 63 has a lead 64 connected through a dropping resistor with the 300 volt plate supply. Cathode 67 of tube 61 is grounded by lead 68 to ground 69.

The amplified signal is fed from plate 63 to the grid 70 of a second vacuum tube 71 through a condenser 72 and grounded resistor 73. Resistor 73 is preferably a Thyrite resistor in order to eliminate blocking and to give the amplifier a rapid recovery time which even with a considerable overload of input signal may be as rapid as 15 milli-seconds.

The plate 74 of tube 71 is energized through a dropping resistor 75 from the 300 volt line by a lead 76 and the cathode 82 is grounded through resistor 84 and condenser 83 to ground wire 69.

Thus, the 400 cycle input signal from point $x$ will be amplified in two stages to a degree usable in the driver stage of amplifier 29 (Fig. 1), the polarity of the signal depending on whether photocell 13 is receiving too much or too little light. Tubes 61 and 71 may be separate high-mu triodes or may be the two halves of a double triode vacuum tube.

The driver stage of the system comprises a triode vacuum tube 77 having its grid 78 coupled to the output of tube 71 by a condenser 79 and resistor 80, a blocking condenser 81 being used between lead 82a from plate 74 and ground wire 69, to prevent feedback.

Cathode 85 is grounded to ground wire 69 through condenser 87 and resistor 86 and plate 88 is energized from the 300 volt supply through dropping resistor 89.

Resistor 80 is also preferably a Thyrite resistor in order to reduce recovery time and prevent blocking.

Tube 77 is transformer coupled to the output stage through a transformer 90, the primary winding 91 of which is in the plate circuit of tube 77 by lead 92.

Secondary winding of transformer 90 feeds the grids of a double-triode vacuum tube 93 and has a coupling condenser 94 thereacross. The two cathodes 95 of the double-triode are grounded to ground wire 69 and the two plates 96 are energized by the 300 volt supply through the primary winding 97 of the output transformer 98 by means of a center tap 99 and lead 100. The secondary winding 101 is directly connected with one phase winding of motor 12, the other phase winding of which will be energized by 400 cycle supply as shown in Fig. 1.

Since the two voltages supplied are at 90° phase angle to each other, motor 12 will rotate in accordance with the amplified signal, as previously described.

A suitable bias supply of, for example, −20 volts D. C. is applied as a fixed grid bias to the grids of double-triode 93, whereby to obtain the maximum power output from the output stage.

As previously described it is desirable with a system of the type so far described to damp operation with a derivative of the error signal, whereby to prevent hunting and cause a retarding force at the end of the cycle of movement halting the mechanism.

Accordingly, a derivative of the displacement is taken which is proportional to the velocity of the whole servo-mechanism forming this system, including the mechanical inertia.

To this end, a variable resistor 35 is provided, the moving arm 102 of which is mechanically linked to the iris-motor drive (34 in Fig. 1). By this means the voltage drop across the resistor changes as a function of iris opening.

In order to obtain accurate results it is necessary to have the current through resistor 34 independent of variations of voltage or the like, to the rest of the system. To provide this voltage and keep it regulated a triode vacuum tube 103 is provided having its plate 104 energized from the 300 volt supply by a lead 105. The grid 106 of tube 103 is connected to a neon bulb 107 by a lead 108 the other side of which is grounded to ground wire 69. Neon bulb 107 is excited from the 300 volt supply through lead 111 and a dropping resistor 110.

The cathode 112 of tube 103 is connected through two matched series resistors 113 and 114 with one side of variable resistor 35 and a filter condenser 115 is connected between ground wire 69 and the common connection of resistors 113 and 114 to point 116. From this point, connections are made to point $z$ of Fig. 2 in order that the derivative may be introduced.

Tubes 103 and 77 may be separate triodes or be the two halves of a double triode vacuum tube. The iris position indicator 37 will be suitably connected in circuit between ground wire 69 and lead 102.

By means of the system hereinbefore described large changes of illumination can be automatically compensated for and the minimum-to-maximum illumination ratio may be as high as any iris can be constructed.

Obviously, by changing the value of resistor $R_3$ (Fig. 2) of the reference information, a new point of balance will be created.

In accordance with a further feature of the present invention there is provided a plurality of resistors $R_3$ with a selector switch to place a desired value into position. By calibration, such resistors can be selected for different shutter speeds and can be operated in connection with a dial marked for shutter speeds.

As shown in Fig. 2, a selector 120 cooperates with a resistor or gang of resistors $R_7$ to alter the values of network B and set up a new balance point between circuits A and B.

Furthermore, by varying the aperture of photocell 13 independently of the irises 11 and 14 different standards of light intensity can be set up.

In the present invention one of several perforated baffles may be inserted in front of the photocell by means of a selector knob and desirably the knob positions will be calibrated with ASA film speed ratings.

While hereinbefore reference has been made to an iris for modifying the effective area of the photocell inversely until the point of balance is reached other known means can replace the iris such as a pair of opposed density wedges which are moved by motor 12 in front of the photocell in opposite directions, whereby the same result is achieved as by opening or closing the iris and the present invention contemplates any such other means as equivalents of the iris 14, within the spirit and scope of the appended claims.

I claim:

1. A system for the automatic control of the lens aperture of an aerial camera to maintain the light intensity at the film in the camera at a preselected value including a barrier layer photocell arranged to view the same scene as the camera lens; a lens iris and a photocell iris; a reversible two-phase electric motor drivingly connected with said irises; an electric heater associated with the photocell and a thermostat controlling said heater to the photocell as a substantially constant temperature; and a control unit for operating said motor in one or the other direction to close the irises comprising a photocell circuit having a condenser in parallel with said photocell, a resistor in series with one side of the photocell and condenser and a rectifier in series with the other side of said photocell and condenser; a reference circuit having a condenser and first resistor in parallel; a second resistor in series with one side of the condenser and resistor and a rectifier in series with the other side of the condenser and first resistor; a source of alternating current supplies at a constant voltage connected to said rectifiers, the condensers of the two circuits being matched and the resistor of the photocell and second resistor of the reference circuit being matched; the value of said first resistor in the reference circuit establishing fixed reference information against which variable information cause by photocell signal under changes of light intensity can be matched; a filter connected to receive error signals when said circuits are unbalanced by such changes in light intensity; means to shift the phase angle of the error signal 90°, a driver amplifier connected to receive the filtered signal; a power amplifier receiving the signal from the driver amplifier and connections from said power amplifier to said motor, to rotate same in accordance with the error signal until the photocell iris is opened or closed to an extent to cause balancing of the circuits again.

2. A system for the automatic control of the lens aperture of an aerial camera to maintain the light intensity at the film in the camera at a preselected value including a barrier layer photocell arranged to view the same scene as the camera lens; a lens iris and a photocell iris; a reversible two-phase electric motor drivingly connected with said irises; an electric heater associated with the photocell and a thermostat controlling said heater to maintain the photocell at a substantially constant temperature; and a control unit for operating said motor in one or the other direction to open or close the irises comprising a photocell circuit having a condenser in parallel with said photocell, a resistor in series with one side of the photocell and condenser and a rectifier in series with the other side of said photocell and condenser; a reference circuit having a condenser and first resistor in parallel, a second resistor in series with one side of the condenser and resistor and a rectifier in series with the other side of the condenser and first resistor; a source of alternating current supplies connected to said rectifiers, the condensers of the two circuits being matched and the resistor of the photocell and second resistor of the reference circuit being matched; the value of said first resistor in the reference circuit establishing fixed reference information against which variable information caused by photocell signal under changes of light intensity can be matched; a filter connected to receive error signals when said circuits are unbalanced by such changes in light intensity; a power amplifier receiving the signal and connections from said power amplifier to said motor, to rotate same in accordance with the error signal until the photocell iris is opened or closed to an extent to cause balancing of the circuits again.

3. A system for the automatic control of the lens aperture of an aerial camera to continuously maintain the light intensity at the film in the camera constant at a preselected value including a photocell arranged to view the same scene as the camera lens; a lens iris and a photocell iris; a reversible electric motor drivingly connected with said irises; and a control unit for operating said motor in one or the other direction to open or close the irises comprising a photocell circuit having a condenser in parallel with said photocell, a resistor in series with one side of the photocell and condenser and a rectifier in series with the other side of said photocell and condenser; a reference circuit having a condenser and first resistor in parallel, a second resistor in series with one side of the condenser and resistor and a rectifier in series with the other side of the condenser and first resistor; a source of alternating current supplies at a constant voltage connected to said rectifiers, the condensers of the two circuits being matched and the resistor of the photocell and second resistor of the reference circuit being matched; the value of said first resistor in the reference circuit establishing fixed reference information against which variable information caused by photocell signal under changes of light intensity can be matched; a filter connected to continuously receive error signals when said circuits are unbalanced by such changes in light intensity; means to shift the phase angle of the error signal 90°, a driver amplifier connected to receive the filtered signal; a power amplifier receiving the signal from the driver amplifier and connections from said power amplifier to said motor, to rotate same in accordance with the error signal until the photocell iris is opened or closed to an extent to cause balancing of the circuits again and reestablishment of the light intensity at the film of the preselected value.

4. A system for the automatic control of the lens aperture of an aerial camera to continuously maintain the light intensity at the film in the camera constant at a preselected value including a photocell arranged to view the same scene as the camera lens; a lens iris and a photocell iris; a reversible electric motor drivingly connected with said irises; and a control unit for operating said motor in one or the other direction to open or close the irises comprising a photocell circuit having a condenser in parallel with said photocell, a resistor in series with one side of the photocell and condenser and a rectifier in series with the other side of said photocell and condenser; a reference circuit having a condenser and first resistor in parallel, a second resistor in series with one side of the condenser and resistor and a rectifier in series with the other side of the condenser and first resistor; a source of alternating current supplies connected to said rectifiers, the condensers of the two circuits being matched and the resistor of the photocell and second resistor of the reference circuit being matched; the value of said first resistor in the reference circuit establishing fixed reference information against which variable information caused by photocell signal under changes of light intensity can be matched; a filter connected to continuously receive error signals when said circuits are unbalanced by such changes in light intensity; a power amplifier receiving the signal and connections from said power amplifier to said motor, to rotate same in accordance with the error signal until the photocell iris is opened or closed to an extent to cause balancing of the circuits again and reestablishment of the light intensity at the film of the preselected value.

5. An automatic light control unit for use in maintaining a preselected constant light intensity under varying conditions of external illumination including in combination a barrier layer photocell, a reference voltage source in circuit with said photocell and opposing said photocell whereby zero potential may be established at a point between the photocell and voltage source, a voltage source including a variable resistor controlled in accordance with the setting of an iris diaphragm controlling the light illuminating the photocell, a comparator to derive current alternately from the reference voltage source and photocell or through a capacitor from the second voltage source, a reversible motor controlling the opening of the iris diaphragm and variable resistor, means for supplying power selectively to drive the motor in one direction or the other in accordance with the unbalance at the comparator until the voltages on said comparator are zero, and a lens iris diaphragm moved with the first iris diaphragm, whereby constant intensity illumination is supplied through said lens to said photocell.

6. A light control unit as claimed in claim 5 in which the second lens iris diaphragm controls the light passed by a camera lens to the sensitized surface in a camera.

7. A light control unit as claimed in claim 5 in which the motor is a two phase motor excited by alternating current from a constant source of power and by current from said comparator varying with the light intensity as measured by said photocell.

8. A light control unit as claimed in claim 5 in which the motor is a two phase motor excited by alternating current from a constant source of power and by current from an amplifier controlled from the comparator by light intensity as measured by the photocell.

9. A light control unit as claimed in claim 8 in which the amplifier is controlled in part by a filtered signal current displaced 90° in phase from the light-intensity controlled current.

10. A light control unit as claimed in claim 5 in which a thermostatically controlled heater is provided for the photocell.

References Cited in the file of this patent

UNITED STATES PATENTS

| Number | Name | Date |
| --- | --- | --- |
| 1,919,182 | Fitzgerald | July 18, 1933 |
| 2,100,755 | Shepard | Nov. 30, 1937 |
| 2,156,440 | Veber | May 2, 1939 |
| 2,297,262 | Tonnier | Sept. 29, 1942 |
| 2,326,853 | Harrison | Aug. 17, 1943 |
| 2,412,424 | Rath | Dec. 10, 1946 |
| 2,417,506 | Lamb | Mar. 18, 1947 |
| 2,420,058 | Sweet | May 6, 1947 |
| 2,421,476 | Belar et al. | June 3, 1947 |
| 2,434,101 | Cann | Jan. 6, 1948 |
| 2,453,693 | Armstrong et al. | Nov. 16, 1948 |